(12) United States Patent
Patrick et al.

(10) Patent No.: US 7,995,538 B2
(45) Date of Patent: Aug. 9, 2011

(54) METHOD AND APPARATUS FOR THROTTLING ACCESS TO A SHARED RESOURCE

(75) Inventors: Christopher Patrick, San Diego, CA (US); Sanjeev Khushu, San Diego, CA (US); Ajay Vasanadu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 711 days.

(21) Appl. No.: 11/400,441

(22) Filed: Apr. 7, 2006

(65) Prior Publication Data

US 2006/0256760 A1 Nov. 16, 2006

Related U.S. Application Data

(60) Provisional application No. 60/669,692, filed on Apr. 7, 2005.

(51) Int. Cl.
*H04B 7/216* (2006.01)
(52) U.S. Cl. ........... 370/335; 370/310.2; 370/316; 370/319; 370/328; 455/456.2; 455/456.4
(58) Field of Classification Search .......... 455/450, 455/434, 515, 509–512, 455, 456.1–456.4; 370/229, 468, 310.2–322, 328, 338
See application file for complete search history.

(56) References Cited

U.S. PATENT DOCUMENTS

| 5,187,805 | A  | * | 2/1993  | Bertiger et al. ........... 455/430 |
| 6,535,736 | B1 | * | 3/2003  | Balogh et al. ........... 455/434 |
| 6,654,342 | B1 | * | 11/2003 | Dittia et al. ........... 370/229 |
| 6,789,203 | B1 |   | 9/2004  | Belissent |
| 6,810,263 | B1 |   | 10/2004 | Cheng et al. |
| 2003/0145236 | A1 |   | 7/2003 | Tateoka |
| 2005/0094558 | A1 | * | 5/2005 | Lu ........... 370/229 |
| 2005/0101336 | A1 | * | 5/2005 | Otsuka ........... 455/456.3 |
| 2005/0186967 | A1 | * | 8/2005 | Ozluturk ........... 455/456.1 |

FOREIGN PATENT DOCUMENTS

| EP | 0475698 A2 | 3/1992 |
| WO | 2005022832 A1 | 3/2005 |

OTHER PUBLICATIONS

International Search Report—PCT/US06/012842—International Search Authority, European Patent Office—Aug. 4, 2006.
Written Opinion—PCT/US06/012842—International Search Authority, European Patent Office—Aug. 4, 2006.
International Preliminary Report on Patentability—PCT/US06/012842—The International Bureau of WIPO, Geneva, Switzerland—Oct. 9, 2007.

* cited by examiner

Primary Examiner — Kamran Afshar
Assistant Examiner — Kathy Wang-Hurst
(74) Attorney, Agent, or Firm — Andrea L. Mays; Linda G. Gunderson

(57) ABSTRACT

A method and apparatus for throttling requests to access a shared resource throttles requests that are made too frequently. The methodology reduces the frequency of requests by setting a throttle end time that is based upon the frequency of previously desired access. Access is denied for a time period up until the throttle end time.

31 Claims, 3 Drawing Sheets

METHOD AND APPARATUS FOR THROTTLING ACCESS TO A SHARED RESOURCE

CROSS REFERENCE TO RELATED APPLICATIONS

This application claims priority to co-pending U.S. Provisional Patent Application Ser. No. 60/669,692 filed Apr. 7, 2005, entitled, "Throttling Algorithm for MS-Based Assistance Data Download Requests," assigned to the assignee of the present application.

BACKGROUND

I. Field

The present methodology relates generally to communication, more specifically to techniques involved in limiting access to a shared resource, and still more specifically to limiting access to data used in determining the position of a wireless network component.

II. Background

In many systems, particularly communication networks, data and other resources are often requested by entities in communication with the network. Accessing such data can tax a communication network, circuitry, or other system hardware. In wireless communication networks, data is often requested and exchanged among entities operating in the network. One example where data is often requested is in a wireless communication network where the position of a mobile terminal operating within the network is desired and data from the network is beneficial in determining the position.

For example, an enhanced 911 (E911) wireless service promulgated by the Federal Communications Commission (FCC) requires the position of a terminal (for example, a cellular telephone) to be provided to a Public Safety Answering Point (PSAP) each time a 911 call is made from the terminal. In addition to the FCC mandate, various applications may use the position of a terminal to provide value-added features and possibly generate additional revenues.

In general, an estimate of the position of a wireless terminal, also commonly known as a mobile station (MS), user equipment (UE), cellular telephone, personal communication system (PCS), wireless laptop computer, etc., may be derived based on (1) the distances or ranges from the terminal to a sufficient number of transmitters, e.g., three or more transmitters, and (2) the known positions of these transmitters. Each transmitter may be a satellite or a base station in a wireless communication network. The distance to each transmitter and/or the position of each transmitter may be ascertained based on a signal sent by the transmitter.

Global Positioning Systems (GPS) determine position based on the measurement of the times of arrival at a GPS receiver antenna of the GPS signals broadcast from orbiting satellites. One disadvantage of the GPS system for location determination is the relatively long time needed to perform signal acquisition under certain conditions. Satellite signals cannot be tracked until they have first been located by searching in a two-dimensional search "space", whose dimensions are code-phase delay and observed Doppler frequency shift.

In order to reduce this delay, information may be provided to aid a GPS receiver in acquiring a particular signal. Such assistance information permits a receiver to narrow the search space that must be searched in order to locate a signal, by providing bounds on the code and frequency dimensions. A system that employs a GPS receiver augmented with externally sourced GPS assistance data is commonly referred to as an "assisted global positioning system" (AGPS).

One example of an AGPS system is a wireless mobile station (MS) with GPS capabilities in communication with one or more base stations (BSs), also referred to as base transmitting stations (BTSs) or node Bs, which in turn communicate with one or more servers, also called Position Determination Entities (PDEs) or Serving Mobile Location Centers (SMLCs) depending upon the communication air interface protocol. The PDE derives GPS assistance information from one or more GPS reference receivers. The PDE also has access to a means of determining the approximate mobile station position. This might consist of a "base station almanac" (BSA) that provides BTS/node B location based upon serving cell identification (ID) reported by the mobile station. The PDE computes the assistance information customized for the approximate mobile station position. The PDE also maintains a GPS database that contains reference time, satellite orbit almanac and ephemeris information, ionosphere information, and satellite working condition ("health") information.

Position location for a terminal can be determined at the terminal (sometimes referred to as MS-based positioning mode) with assistance from a PDE, for example, in an AGPS system, or at the PDE and transmitted back to the terminal using information acquired by the terminal (sometimes referred to as MS-assisted positioning mode).

During MS-based positioning mode, when a GPS engine requires updated aiding data such as ephemeris data, almanac data regarding the location of satellites or base stations, timing information for the base stations and/or satellites, or seed position (such as, but not limited to that determined by advanced forward link trilateration (AFLT)), and so on, the next position fix will result in the mobile station contacting the communication network for data.

While normal operation should limit such intermittent requests to between every thirty to ninety minutes, there is a possibility that due to a variety of connectivity problems, for example air interface issues, authentication or authorization problems, problems with the data network, problems with the PDE, etc., MS-based aiding data download requests may fail, resulting in aiding data being requested more frequently. As a result of the inability to download MS-based aiding data, frequent, repeated attempts are made by the mobile station to access the network to retrieve the aiding data, and these attempts result in continued failure. Such communication consumes additional power and communication system bandwidth that impacts overall capacity. A need exists to prevent a mobile station from repeatedly accessing the network for MS-based aiding data when network or other conditions cause frequent failed downloads.

SUMMARY

Techniques for throttling access to a shared resource are described herein. Advantageously these techniques distribute requests made for the resource reducing the frequency at which they are made.

In an embodiment of the throttling technique, a method is set forth for comparing a current time at which access to a resource is desired to a throttle end time; throttling an access request depending upon the outcome of the comparison; and controlling the throttle end time according to the frequency that previous access was desired. A variable back off duration is used to set the throttle end time. The variable back off duration can be set at a minimum value or a maximum value. The variable back off duration can be increased by a factor.

The current time at which access to a resource is desired may be compared to a last request time at which access to a resource was desired. This comparison may include adding a back off reset duration time period to the last request time. If the current time is later than the last request time plus a back off reset duration, the throttle end time may be set to the current time plus a back off minimum duration.

In another embodiment a system is set forth which includes means for implementing the described methodology. In yet another embodiment a system is set forth which includes a machine readable medium tangibly embodying instructions for throttling access requests to a shared resource. A processor is coupled to the machine readable medium for executing instructions therefrom.

Various aspects and embodiments of the invention are described in further detail below.

BRIEF DESCRIPTION OF THE DRAWINGS

The features and nature of the method and apparatus herein will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
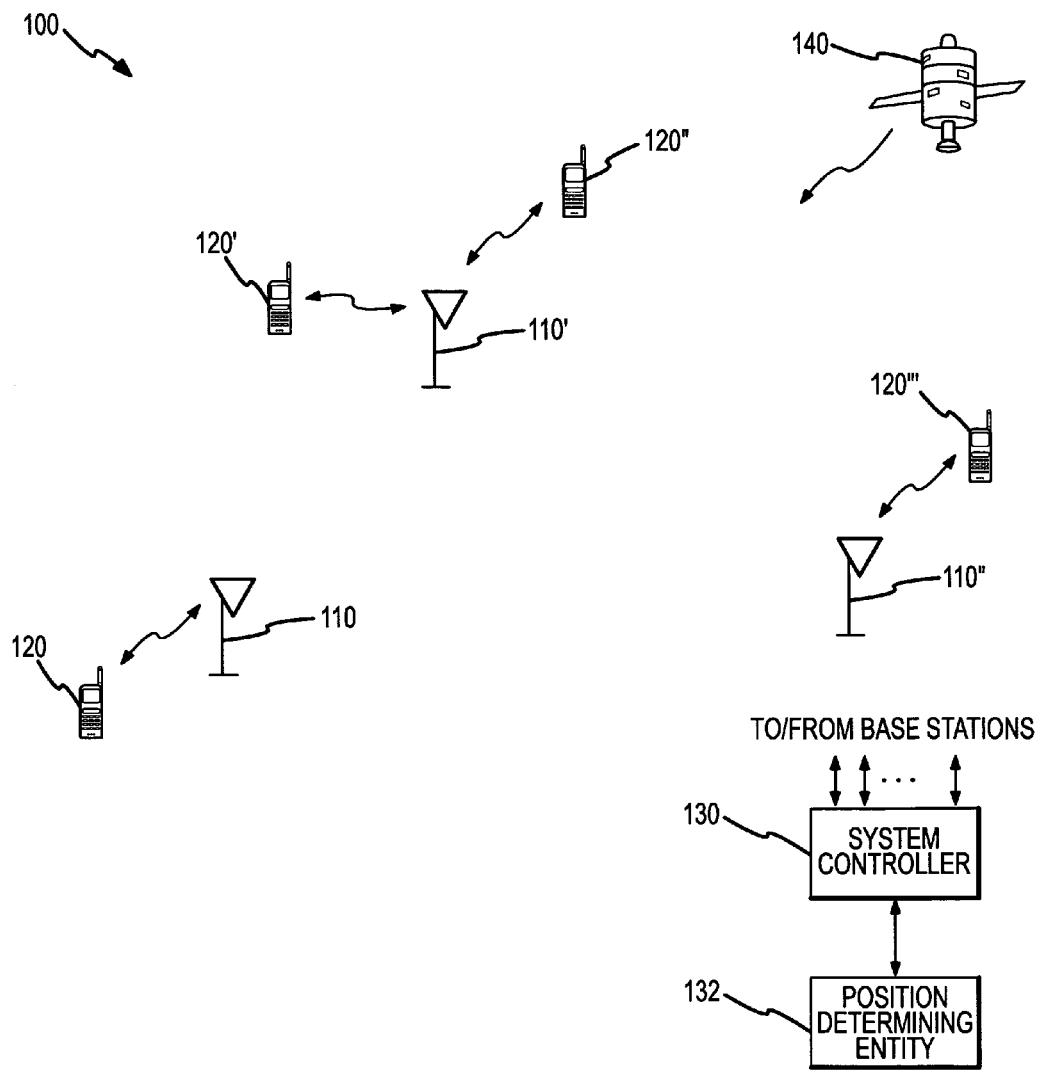
FIG. 1 shows a wireless communication system.

FIG. 1 shows a wireless multiple-access communication network 100 in which the throttling methodology and apparatus may be implemented. Network 100 includes multiple base stations 110, with each base station providing communication coverage for a particular geographic area. A base station is generally a fixed station that communicates with the terminals, hereinafter referred to generically as mobile stations (MSs). A base station may also be called an access point, a Node B, a beacon, or some other terminology. The term "cell" can refer to a base station and/or its coverage area depending on the context in which the term is used. The base stations may have coverage areas of different sizes and shapes, which may be determined by various factors such as terrain, obstructions, and so on. To improve system capacity, a base station coverage area may be partitioned into multiple smaller areas. Each smaller area is served by a respective base transceiver subsystem (BTS). For simplicity, in the following description, the term "base station" generically refers to a fixed station that serves a sector as well as a fixed station that serves a cell.

A system controller 130 couples to base stations 110 and provides coordination and control for these base stations. System controller 130 may be a single network entity or a collection of network entities. For example, system controller 130 may include one or more of a Base Station Controller (BSC), a Mobile Switching Center (MSC), a Radio Network Controller (RNC), a Packet Data Serving Node (PDSN), and/or some other network entity. A Position Determining Entity (PDE) 132 supports position determination for the mobile stations 120. For example, PDE 132 may provide assistance data used by the mobile stations to determine position, in MS-based mode. PDE 132 may also compute position estimates for the mobile stations 120 based on ranging measurements provided by the mobile stations and/or the base stations, in MS-assisted mode.

Mobile stations 120 are typically dispersed throughout network 100, and each mobile station may be fixed or mobile. A mobile station 120 may also be called a terminal, an access terminal, user equipment, or some other terminology. Mobile station 120 may be a wireless device, a cellular telephone, a wireless modem, a wireless module, a personal digital assistant (PDA), laptop with wireless access, and so on. A mobile station 120 may communicate with zero, one, or multiple base stations on the forward and/or reverse links at any given moment. A mobile station 120 may also receive signals from satellites 140, which may be from a Global Positioning System (GPS), Galileo and/or other satellite positioning or communication systems, each referred to generally herein as a Satellite Positioning System (SPS). In general, a mobile station 120 may communicate directly with network 100 if good received signal quality can be achieved for both the forward and reverse links. A mobile station may communicate indirectly with network 100, via peer-to-peer communication with at least one other mobile station, if the required received signal quality is not achieved for one or both of the links.

In general, a position estimate for a mobile station 120 may be computed based on ranging measurements for a sufficient number of transmitters, which may be of the same or different types, and the positions of these transmitters. The position estimate may be computed based on (1) ranging measurements made by the mobile station for base stations, satellites, and/or other transmitters (e.g., broadcast stations, WLAN terminals, and so on), (2) ranging measurements made by ranging mobile stations, base stations, and/or other receivers for the mobile station, or (3) any combination thereof. Ranging measurements with higher reliability (e.g., measurements for satellites) may be given greater weight in the computation of the position estimate.

Figure 2:
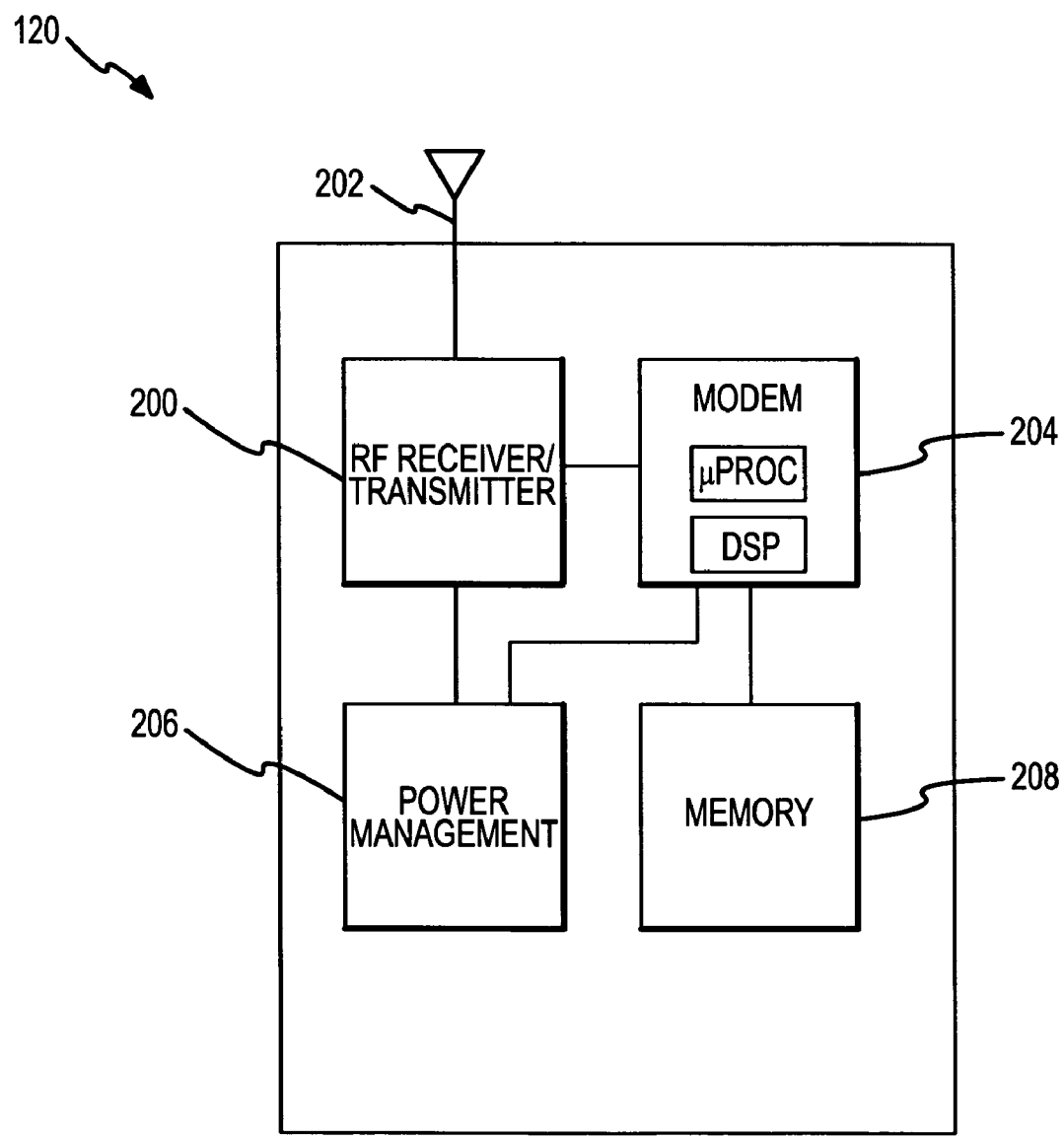
FIG. 2 shows a diagram of components included in a conventional mobile station.

FIG. 2 shows a block diagram of basic components included in a conventional mobile station 120 having position location capability. Mobile station 120 includes a wireless communication transceiver 200 and associated antenna 202 capable of sending and receiving wireless communication signals as well as receiving SPS signals. Modem 204 includes the appropriate microprocessor(s) and digital signal processor(s) and other suitable hardware, such as but not limited to a correlator bank, for processing signals. Power management 206 controls power issues for various components of the mobile station 120. Memory 208 is coupled to modem 204 as necessary for implementing various modem processes.

It will be appreciated by those skilled in the art that mobile station 120 can include a variety of components. Because the mobile station 120 may obtain assistance data from the wireless network 100 to compute a position estimate for itself, requests for assistance data, also referred to as aiding data, can be limited by the methodology herein. The methodology described herein may be implemented by a microprocessor and memory of mobile station 120, but is certainly not limited to such an implementation.

The method and apparatus herein throttles requests for a shared resource such as data. Throttling such requests prevents excessive requests by increasing the time period between them. Requests for the resource are throttled if they arrive prior to a throttle end time that is established by an algorithm. The next time that the request is permitted is determined by a variable back off duration that is adjusted depending on the frequency that previous access to a resource was desired. This methodology is suitable for controlling access to a shared resource in many applications, for example but not limited to access to a central processing unit (CPU), access to a particular resource in a communication network, either wireless or landline, or in any application where a resource is sought by a plurality of entities and access to the resource needs to be restricted.

While the methodology has endless application as will be appreciated by those skilled in the art, it is described herein as it pertains to resources accessed through a wireless communication network, specifically to accessing aiding data, including but not limited to ephemeris, almanac, and/or seed position, in MS-based position location mode which is used for determining positioning. This exemplary embodiment provides an understanding of the usefulness of the methodology.

The following runtime variables to govern the operation of the methodology are used herein:

"Back off duration" tracks the current duration to throttle requests. If access to requesting MS-based aiding data is desired too frequently, this value grows exponentially using a "back off factor" as a multiplier.

"Throttle end time" determines whether an MS-based aiding data request is honored or rejected.

"Last request time" is the previous time at which an MS-based aiding data request was desired.

"Current time" is a current system time.

The following compile time configuration settings are used herein to describe the methodology:

"Back off factor" defines the back off multiplier that is used to grow the back off duration.

"Back off minimum duration" defines the minimum duration for the back off duration.

"Back off maximum duration" defines the maximum duration for the back off duration.

"Back off reset duration" defines the duration between attempts at requesting MS-based aiding data that will be required to reset the back off duration. If this condition is met, the back off duration will be reset to back off minimum duration.

Figure 3:
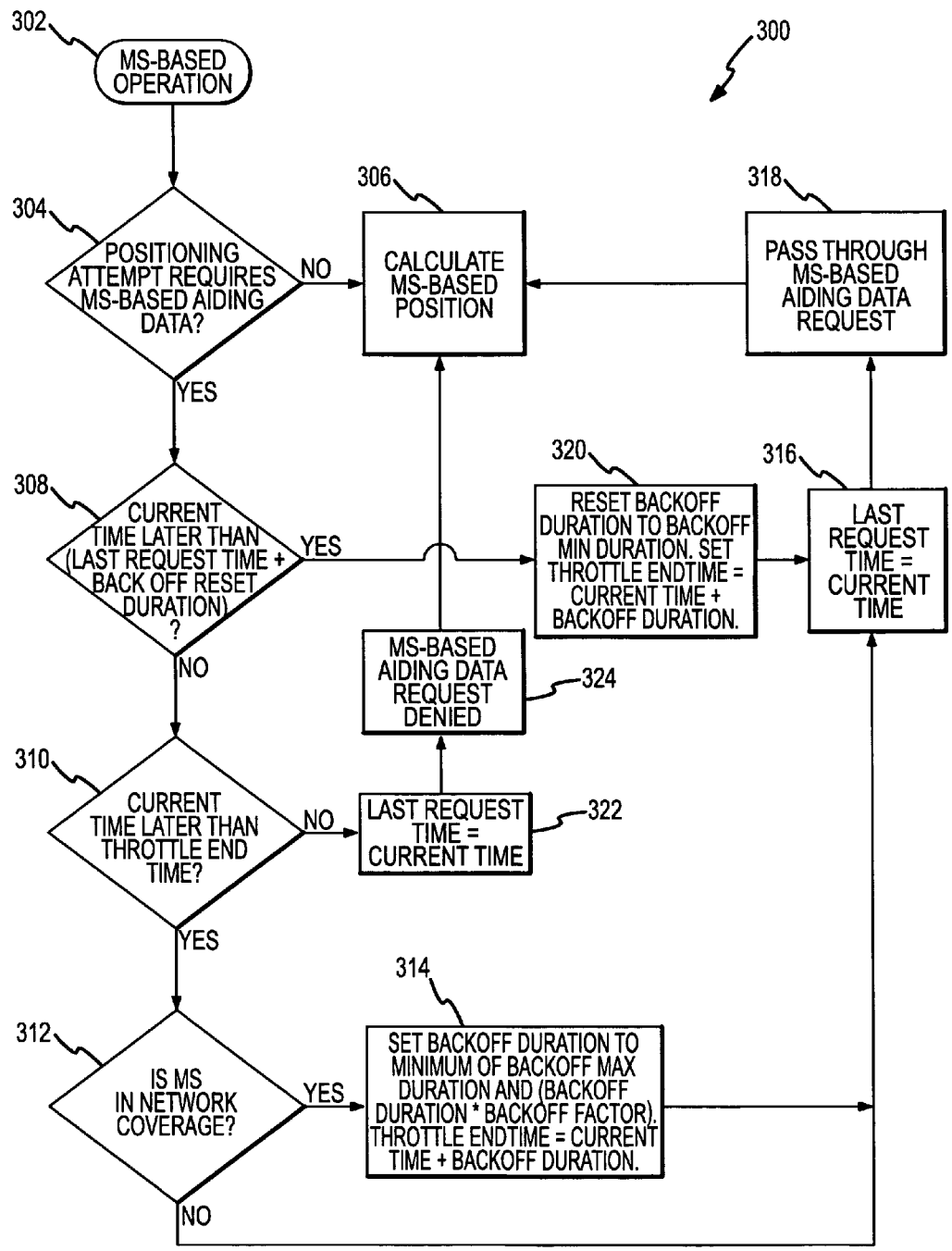
FIG. 3 shows a diagram of a methodology for throttling requests for a shared resource.

FIG. 3 shows a diagram of a methodology for MS-based aiding data download throttling 300. Throttling time is based upon the frequency of the mobile station desiring access to the network. During an initialization the last request time is set to 0; the back off duration is set to a defined back off minimum duration, for example, one minute; back off maximum duration is set to a defined time, for example fifteen minutes; throttle end time is set to 0; back off reset duration is set to a defined amount of time, for example thirty minutes; and the back off factor is set to a defined value such as four. It will be understood by those skilled in the art that these variables and compile times can be set to any suitable value within the scope of the methodology.

When the mobile station is in MS-based operational mode 302, a positioning attempt is made. A determination is made whether the positioning attempt requires aiding data, 304. If no aiding data is required, for example, when a previous download of aiding data was successful in the past within a previously-defined time period and that data remains valid, then the position is calculated using the valid aiding data, 306.

If the positioning attempt requires MS-based aiding data, then the current time is compared to the last request time plus the back off reset duration, 308. It is to be understood that "last request time" is defined as the last time that aiding data was desired, regardless of whether a request for aiding data was permitted to be made of the network. As an example, the current time may be 8:15 AM; the last request time may have been at 8:00 AM; and the back off reset duration may be set to 30 minutes. Thus, in this example, the current time (8:15) is not later than the last request time (8:00) plus the back off reset duration (30 minutes), or 8:30. The current time is then compared to the throttle end time, which was initialized to effectively "zero", 310. In this example, the current time of 8:15 AM is thus later than "zero", and the request is not throttled.

Assuming that the mobile station is within network coverage 312, then the back off duration is set to the minimum of back off maximum duration and (back off duration * back off factor); and the throttle end time is set equal to the current time plus the back off duration, 314. Continuing with the present example, assume that the back off duration is presently set at back off minimum duration due to initialization, or one minute. The back off duration would then be set to the minimum of the initial back off maximum duration (e.g. 15 minutes) and (back off duration * back off factor) (e.g. 1 minute * 4=4 minutes), which is 4 minutes. Throttle end time would be set equal to the current time (8:15 AM) plus the back off duration (4 minutes), or 8:19 AM.

Regardless of whether the mobile station is within network coverage, the last request time is then set equal to the current time, 316. For the present example, the last request time would thus be set to 8:15 AM. The request for aiding data is permitted, 318. Then the MS-based position fix is determined, 306. If the mobile station is not within network coverage, 312, the request is allowed, 318, but presumably will fail due to the inability to contact the network. Optionally, if the mobile station is not within network coverage, 312, the last request time will be set to the current time, 322, and the aiding data request will be prevented, 324.

Returning to FIG. 3, 308, if the current time (e.g. 8:15 AM) had been later than the last request time, for example 7:30 AM, plus the back off reset duration (30 minutes) or 8:00 AM, this indicates that a reasonable amount of time has passed since the last aiding request and that the back off duration should be reset to a minimum value. In this example the back off duration would then be reset to the back off minimum duration (1 minute), and the throttle end time would be set equal to the current time (8:15 AM) plus the back off duration (1 minute), or 8:16 AM, 320. The last request time is then set equal to the current time (8:15 AM), 316. The request for aiding data is permitted, 318. Then the MS-based position fix is determined, 306.

If the current time (e.g. 8:15 AM) had not been later than the last request time (e.g. 8:00 AM) plus the back off reset duration (30 minutes), or 8:30 AM, 308, and was also not later than the throttle end time (e.g. 8:16 AM), 310, then the aiding data request will be throttled. The last request time is set equal to the current time (8:15 AM), 322, and the aiding data request is denied, 324. The MS-based position fix is determined without having allowed the request, 306.

The process begins again each time MS-based operation, 302, requires aiding data for a positioning attempt, 304. Through this process, the throttle end time is effectively pushed out further and further from the current time by the back off factor, thereby throttling the aiding data request, based on the frequency of requests. The throttle end time is pushed out until the back off duration reaches the back off maximum duration, and the requests are then throttled until the current time surpasses the throttle end time.

Runtime variables and compile time configuration settings can be stored in memory and accessed as necessary to implement the methodology herein. The methodology can be implemented via suitable routines operating on one or more processor(s) and associated memory, or other suitable hardware.

Position determination techniques described herein may be used for various wireless communication networks such as a wireless wide area network (WWAN),. a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11× network, and a WPAN may be a Bluetooth network, an IEEE 802.15×, or some other type of network. The techniques may also be used for any combination of WWAN, WLAN and/or WPAN.

The throttling methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory 208 of mobile station 120, and executed by a processor, for example the microprocessor of modem 204. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the throttling methodology. Various modifications to these embodiments will be readily apparent to those skilled in the art, and the generic principles defined herein may be applied to other embodiments without departing from the spirit or scope of the methodology. Thus, the methodology described herein is not intended to be limited to the embodiments shown herein but is to be accorded the widest scope consistent with the principles and novel features disclosed herein.

What is claimed is:

1. A method, comprising:
comparing at a mobile station a current time to a last request time at which access by the mobile station to a shared resource through a communication network was previously desired, the shared resource comprising position aiding data, said communication network facilitating communication between said shared resource and said mobile station;
in response to the comparison indicating a first relationship, initiating transmission of an access request through said communication network for the position aiding data from the mobile station directed toward the shared resource and computing at the mobile station a position of the mobile station based, at least in part, on at least a portion of the position aiding data obtained at the mobile station responsive to the access request; and
in response to the comparison indicating a second relationship, throttling from the mobile station directed toward the shared resource an access request for the position aiding data and computing at the mobile station a position of the mobile station without the position aiding data.

2. The method of claim 1 further comprising:
controlling at the mobile station a throttle end time relative to the last request time based, at least in part, on a period of time between the last request time and one or more requests for access occurring before the last request time;
wherein the comparison indicates the first relationship if the current time is later than the throttle end time; and
wherein the comparison indicates the second relationship if the current time is earlier than the throttle end time.

3. The method of claim 2 wherein controlling the throttle end time comprises setting the throttle end time to the last request time plus a variable back off duration.

4. The method of claim 3 wherein the variable back off duration comprises a back off minimum duration.

5. The method of claim 3 wherein the variable back off duration comprises a back off maximum duration.

6. The method of claim 3 wherein the variable back off duration comprises a back off duration increased by a factor.

7. The method of claim 2, wherein the comparing the current time to the last request time further comprises comparing the current time to the last request time plus a back off reset duration comprising a defined period of time.

8. The method of claim 7 wherein controlling the throttle end time comprises setting the throttle end time to the current time plus a back off minimum duration comprising a defined amount of time, if the current time is later than the last request time plus a back off reset duration.

9. The method of claim 1 wherein the shared resource further comprises a central processing unit.

10. A system, comprising:
means for comparing at a mobile station a current time to a last request time at which access to a shared resource through a communication network was previously desired, the shared resource comprising position aiding data said communication network facilitating communication between said shared resource and said mobile station;

in response to the comparison indicating a first relationship, means for initiating transmission of an access request through said communication network for the position aiding data by the mobile station directed toward the shared resource and means for computing at a mobile station a position of the mobile station based, at least in part, on at least a portion of the position aiding data obtained at the mobile station responsive to the access request; and in response to the comparison indicating a second relationship, means for throttling from the mobile station directed toward the shared resource an access request for the position aiding data and means for computing at a mobile station a position of the mobile station without the position aiding data.

11. The system of claim 10 further comprising:
means for controlling at the mobile station a throttle end time relative to the last request time based, at least in part, on a period of time between the last request time and one or more requests for access occurring before the last request time;
wherein the means for comparing comprises a means for indicating the first relationship if the current time is later than the throttle end time; and
wherein the means for comparing comprises a means for indicating the second relationship if the current time is earlier than the throttle end time.

12. The system of claim 11 wherein the means for controlling the throttle end time comprises means for setting the throttle end time to the last request time plus a variable back off duration.

13. The system of claim 12 wherein the variable back off duration comprises a back off minimum duration.

14. The system of claim 12 wherein the variable back off duration comprises a back off maximum duration.

15. The system of claim 12 wherein the variable back off duration comprises a back off duration increased by a factor.

16. The system of claim 11 wherein the means for comparing the current time to the last request time comprises means for comparing the current time to the last request time plus a back off reset duration comprising a defined period of time.

17. The system of claim 16 wherein the means for controlling the throttle end time comprises means for setting the throttle end time to the current time plus a back off minimum duration comprising a defined amount of time, if the current time is later than the last request time plus a back off reset duration.

18. An article comprising:
a machine readable medium tangibly embodying instructions which, in response to being executed by a processor, direct said processor to:
compare at a mobile station a current time to a last request time at which access by a mobile station towards a shared resource through a communication network is desired, the shared resource comprising position aiding data, said communication network facilitating communication between said shared resource and said mobile station;
in response to the comparison indicating a first relationship, initiate transmission of an access request through said communication network for the position aiding data from the mobile station directed toward the shared resource and compute at a mobile station a position of the mobile station based, at least in part, on at least a portion of the position aiding data obtained at the mobile station responsive to the access request; and
in response to the comparison indicating a second relationship, throttle an access request for the position aiding data at the mobile station and compute at a mobile station a position of the mobile station without the position aiding data.

19. The article of claim 18, wherein said instructions, in response to being executed by said processor, are adapted to further direct said processor to:
control at the mobile station a throttle end time relative to the last request time based, at least in part, on a period of time between the last request time and one or more requests for access occurring before the last request time;
indicate the first relationship for the comparison if the current time is later than the throttle end time; and
indicate the second relationship for the comparison if the current time is earlier than the throttle end time.

20. The article of claim 19, wherein said instructions, in response to being executed by said processor, further direct said processor to control the throttle end time by setting the throttle end time to last request time plus a variable back off duration.

21. The article of claim 20 wherein the variable back off duration comprises a back off minimum duration.

22. The article of claim 20 wherein the variable back off duration comprises a back off maximum duration.

23. The article of claim 20 wherein the variable back off duration comprises a back off duration increased by a factor.

24. The article of claim 19, wherein said instructions, in response to being executed by the processor, further direct said processor to compare the current time to the last request time by comparing the current time to the last request time plus a back off reset duration comprising a defined period of time.

25. The article of claim 24, wherein said instructions, in response to being executed by the processor, further direct said processor to control the throttle end time at the mobile station in a manner that sets the throttle end time to the current time plus a back off minimum duration comprising a defined amount of time, if the current time is later than the last request time plus a back off reset duration.

26. A mobile station comprising:
a transceiver adapted to communicate with a shared resource through a communication network, said communication network facilitating communication between said shared resource and said mobile station; and
a processor programmed with instructions to:
compare a current time to a last request time at which access by the mobile station through said communication network towards the shared resource is desired, the shared resource comprising position aiding data;
in response to the comparison indicating a first relationship, initiate transmission of an access request through said communication network for the position aiding data from the mobile station directed toward the shared resource and compute a position of the mobile station based, at least in part, on at least a portion of the position aiding data obtained at the mobile station responsive to the access request; and
in response to the comparison indicating a second relationship, throttle an access request for the position aiding data at the mobile station and compute a position of the mobile station without the position aiding data.

27. The mobile station of claim 26, wherein said processor is further programmed with instructions to:

control a throttle end time relative to the last request time based, at least in part, on a period of time between the last request time and one or more requests for access occurring before the last request time;

indicate the first relationship for the comparison if the current time is later than the throttle end time; and indicate the second relationship if the current time is earlier than the throttle end time.

28. The mobile station of claim 27 wherein said processor is further programmed with instructions to control the throttle end time by setting the throttle end time to the last request time plus a variable back off duration.

29. The mobile station of claim 28 wherein the variable back off duration comprises a back off minimum duration.

30. The mobile station of claim 28 wherein the variable back off duration comprises a back off maximum duration.

31. The mobile station of claim 28 wherein the variable back off duration comprises a back off duration increased by a factor.

* * * * *